United States Patent [19]

van Veldhuisen et al.

[11] Patent Number: 5,094,337
[45] Date of Patent: Mar. 10, 1992

[54] METHOD AND APPARATUS FOR TRANSFERRING OBJECTS FROM A FIRST CONVEYOR TO A SECOND CONVEYOR WHICH IS ARRANGED SUBSTANTIALLY PERPENDICULARLY TO THE FIRST CONVEYOR

[75] Inventors: Willem van Veldhuisen, Lunteren; Henk van Essen, Terschuur, both of Netherlands

[73] Assignee: Terpa Poultry B.V., Amstelveen, Netherlands

[21] Appl. No.: 513,936

[22] Filed: Apr. 24, 1990

[30] Foreign Application Priority Data

Apr. 28, 1989 [NL] Netherlands .................. 8901083

[51] Int. Cl.[5] .................. B65G 43/08; B65G 47/68
[52] U.S. Cl. ............................ 198/357; 198/448
[58] Field of Search .............. 198/347.1, 357, 437, 198/444, 448, 572, 575, 358, 457, 464.2, 418.1, 418.2; 53/168

[56] References Cited

U.S. PATENT DOCUMENTS

| | | |
|---|---|---|
| 1,913,533 | 6/1933 | Brunner . |
| 1,916,532 | 7/1933 | Roberts et al. ............ 198/357 |
| 2,304,447 | 12/1942 | Feusier ...................... 198/357 |
| 3,140,771 | 7/1964 | Harrison et al. .......... 198/575 X |
| 3,166,181 | 1/1965 | Rutkus et al. . |
| 3,187,878 | 6/1965 | Harrison et al. .......... 198/572 X |
| 3,491,903 | 1/1970 | Hedrick et al. ........... 198/357 X |
| 3,493,095 | 2/1970 | Messerly ................... 198/457 X |
| 3,737,019 | 6/1973 | Coleman et al. . |
| 3,747,781 | 7/1973 | Daigle et al. .............. 198/357 X |
| 4,135,345 | 1/1979 | Egee et al. . |
| 4,240,538 | 12/1980 | Hawkes et al. ........... 198/437 X |
| 4,356,920 | 11/1982 | van der Schoot ......... 209/513 |
| 4,429,781 | 2/1984 | Holzhauser ............... 198/357 X |
| 4,526,266 | 7/1985 | Dietz ........................ 198/357 |
| 4,915,209 | 4/1990 | Canziani .................. 198/357 |

FOREIGN PATENT DOCUMENTS

| | | |
|---|---|---|
| 0237299 | 9/1987 | European Pat. Off. . |
| 0305755 | 3/1989 | European Pat. Off. ......... 198/464.2 |
| 1224646 | 9/1966 | Fed. Rep. of Germany . |
| 2504584 | 8/1975 | Fed. Rep. of Germany . |
| 2826453 | 2/1979 | Fed. Rep. of Germany ...... 198/448 |
| 1260830 | 4/1961 | France . |
| 1292594 | 3/1962 | France . |
| 2096810 | 3/1972 | France . |
| 2107219 | 5/1972 | France . |
| 2623482 | 5/1989 | France . |
| 8000714 | 8/1980 | Netherlands . |
| 80/01903 | 9/1980 | World Int. Prop. O. . |

Primary Examiner—Michael S. Huppert
Assistant Examiner—Edward M. Wacyra
Attorney, Agent, or Firm—Griffin, Branigan & Butler

[57] ABSTRACT

The invention relates to a method and apparatus for transferring objects from a first conveyor to a second conveyor which is arranged substantially perpendicularly to the first conveyor, the objects being transferred in parallel relationship to themselves. The first conveyor travels at a higher speed than the second conveyor. The transfer may be effected by means of one or more transfer members adapted to make an oblique movement in such a way that the component of velocity in the direction of travel of the first conveyor is approximately the same as the speed of the first conveyor and the component of velocity in the direction of travel of the second conveyor is approximately the same as the speed of the second conveyor.

13 Claims, 5 Drawing Sheets

METHOD AND APPARATUS FOR TRANSFERRING OBJECTS FROM A FIRST CONVEYOR TO A SECOND CONVEYOR WHICH IS ARRANGED SUBSTANTIALLY PERPENDICULARLY TO THE FIRST CONVEYOR

The invention relates to a method and apparatus for transferring objects from a first conveyor to a second conveyor which is arranged substantially perpendicularly to the first conveyor, the objects being transferred in parallel relationship to themselves.

Such a method is disclosed in for instance U.S. Pat. No. specification 4,356,920.

The present invention aims to improve the method known from that U.S. patent specification in such a way that a proper transfer is ensured, i.e. that the objects are indeed transferred in parallel relationship to themselves.

To this effect the method according to the invention is characterized in that the first conveyor travels at a higher speed than the second conveyor. Thus, the chances of an object being properly positioned on the second conveyor become maximal.

An improvement of this method can be achieved when the transfer is effected using one or more transfer members adapted to make an oblique movement in such a way that the component of velocity in the direction of travel of the first conveyor is approximately equal to the speed of the first conveyor and that the component of velocity in the direction of travel of the second conveyor is approximately equal to the speed of the second conveyor. The velocities of the two mutually substantially perpendicular components of velocity may be approximately equal to the speed of the first conveyor.

The invention further relates to an apparatus for transferring objects from a first conveyor to a second conveyor arranged substantially perpendicularly to the first conveyor, permitting the objects to be transferred in parallel relationship to themselves, the apparatus being characterized by one or more transfer members adapted to make an oblique movement relative to the two conveyors.

Each transfer member may be mounted on an endless belt or chain mounted above the conveyor in a frame.

In a further elaboration of the invention each transfer member may comprise pins or strips mounted perpendicularly to the belts or chains.

The transfer member may also be mounted on the end of a piston rod of a pneumatically or hydraulically controlled cylinder which may be arranged for action above the level of the two conveyors, while a second cylinder enables it to return via a different path so as to avoid collision with a next object.

In a variant of this embodiment each transfer member is mounted on the end of a piston rod of a pneumatic or hydraulic piston-cylinder assembly mounted on a rotary table whose central axis is perpendicular to the central axis of the piston-cylinder assembly.

For determining a proper start of the transfer cycle, a photo cell or the like can be provided at the transfer station, this photo cell determining the proper transfer position in cooperation with a photo cell arranged at a known distance upstream of the transfer station and with reference to a product characteristic, such as weight, colour, shape, product code or the like, which is temporarily stored in a memory.

In a further elaboration of the invention a plurality of transfer stations may be arranged side by side above one and the same first conveyor, the transfer stations being used to selectively transfer the objects according to their characteristics to one of the second conveyors arranged side by side.

The invention further relates to a method of transporting packed products supplied from a plurality of parallel conveyors arranged side by side to a single second conveyor arranged transversely to said first conveyor, this method being characterized in that the first conveyors arranged in parallel interrelationship each comprise a plurality of parts, viz. (viewed in the direction of transport) a first part, which is driven at a constant speed, a second part, which is driven at a varying, but lower speed than the first part and serves as a buffer, and a third part that either is stationary or rotates at a higher speed than the two other parts and serves for transferring the product to the transverse conveyor.

This third part can be moved depending on the load of the second conveyor.

Further, the aforesaid second and third parts can rotate at the same time or both be stationary.

An apparatus for carrying out the method mentioned last is characterized by a first conveyor comprising a first part with a constant speed, a second part, a so-called buffer part, and a third part or pitching belt, which buffer belt and pitching belt rotate or are stationary simultaneously, the pitching belt, however, being capable of rotating at a substantially higher speed than the buffer belt, the buffer belt, in its turn, being capable of rotating at a lower speed than the first part.

Such an apparatus may comprise at least one photo cell for detecting objects on the second conveyor upstream of the location of the pitching belt, and a second photo cell for controlling the pitching belt and the buffer belt coupled to it, thus causing the pitching belt and the buffer belt to be stationary when a product is supplied via the second conveyor.

In a further elaboration of the invention a plurality of second delivery conveyors may be arranged above each other and the pitching belt may be arranged for rotary movement between the buffer belt on the one hand and the various second transverse carry-off conveyors on the other.

The pitching belt may be adjusted depending on the class of weight of the packed products supplied.

Further, a roller conveyor may be arranged above or below the second transverse carry-off conveyors arranged above each other.

In a further elaboration of the invention a processing station such as a foiling machine may be arranged at the end of the second, transverse carry-off conveyor or of a carry-off belt connecting to it.

To ensure the proper operation of the first conveyor belt or the pitching belt, they may be made of a material having a high coefficient of friction.

To ensure the proper position of the packs on the second conveyor, the second conveyor may be made of a material having a low coefficient of friction.

For the sake of completeness reference is further made to European patent application 0 237 299 disclosing an apparatus for supplying workpieces from a supply conveyor to a belt conveyor of a processing machine, there being provided a transfer belt adapted to be driven at a variable speed in such a way that the product supplied is taken up at the same speed as that of the supply conveyor and is delivered to the belt conveyor at the same speed as that of the belt conveyor. The changes in speed are such that the product is delivered onto the belt conveyor in a pre-determined position.

To elucidate the invention, a few embodiments of an apparatus for transferring objects from a first conveyor to a second conveyor will now be described and illustrated, by way of example, with reference to the accompanying drawings, in which FIG. 1 is a schematic top plan view of an apparatus for carrying off packed products via a second, transverse conveyor;

Figure 1:
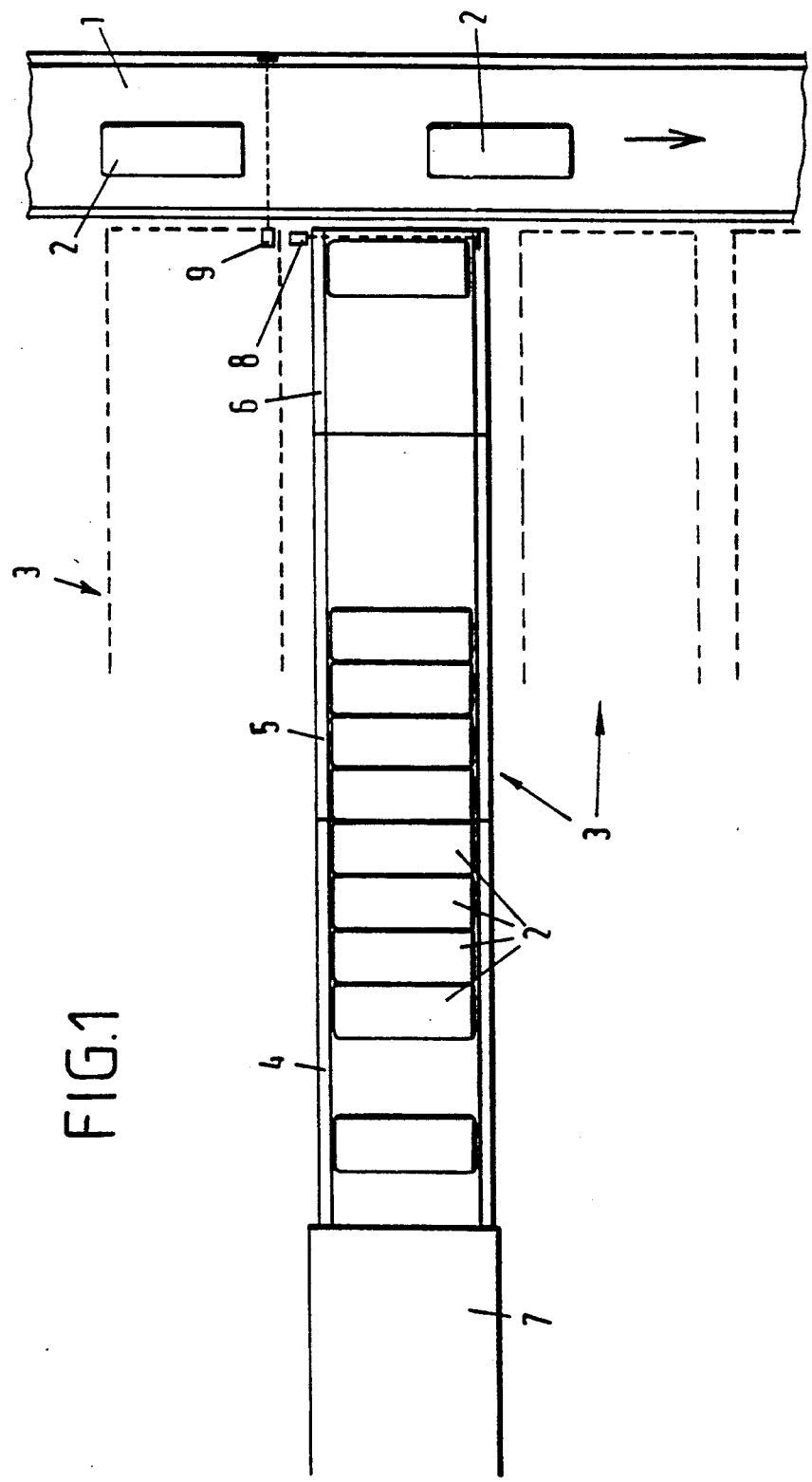
Figure 2:
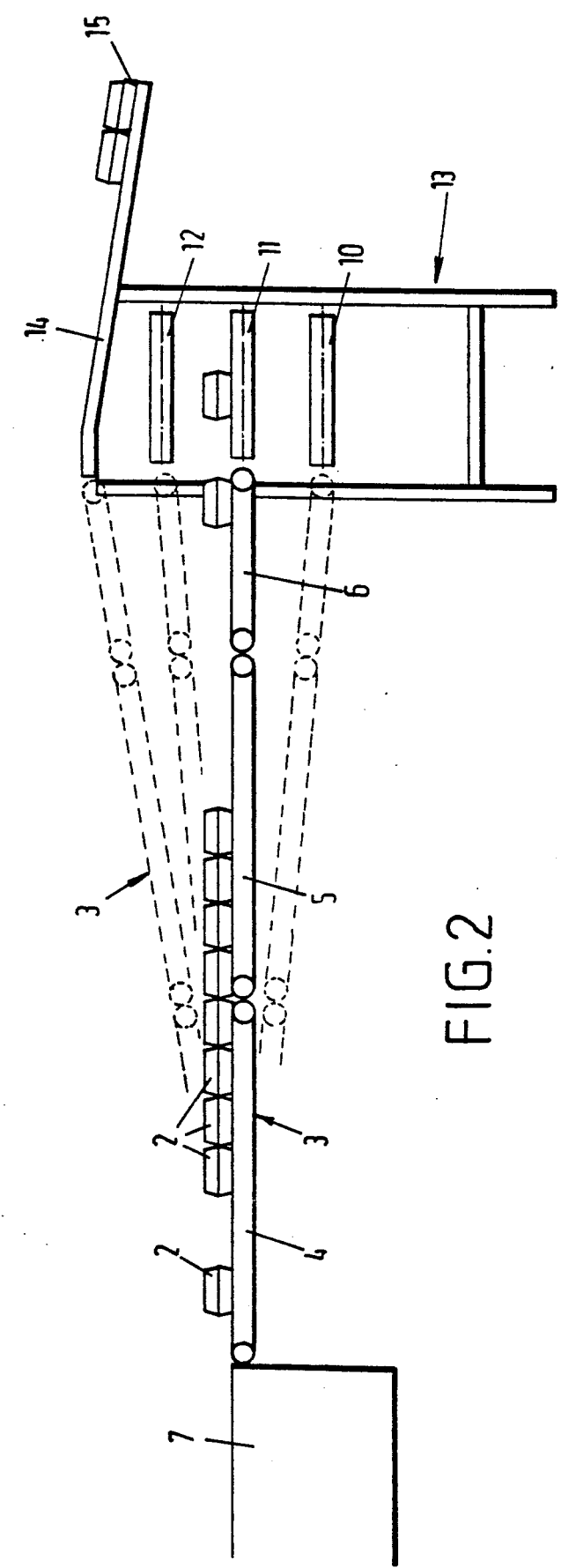
FIG. 2 is a schematic side-elevational view of the apparatus according to FIG. 1.

FIGS. 1 and 2 show an apparatus for carrying off packed products 2 via a second or transverse conveyor 1, comprising a plurality of conveyors, generally designated by 3, arranged in parallel interrelationship and transversely to said transverse conveyor.

Each conveyor 3 essentially consists of a first part 4, a second part 5, and a third part 6. Upstream of the first part 4 a supply conveyor 7 is arranged supplying in known manner packs 2 to said first part 4 which is driven at a constant speed. The second part 5 is periodically driven at a varying, but lower speed than the first part, and thus serves as a buffer together with the first part 4. The third part 6 either is stationary or is driven at a higher speed than the two other parts and serves for transferring the products from the buffer part 5 to the transverse conveyor 1, and also for rendering the products clear of each other, for instance to permit them to be detected or counted. Due to the fact that the third part 6 is rotated at a high speed, it is sometimes referred to as a pitching belt. To ensure that the pack supplied ends up on the transverse conveyor 1 in the proper position, the third part—i.e. the pitching belt—is made of a material having a very high coefficient of friction, for instance canvas, whereas the transverse conveyor is made of a material having a very low coefficient of friction.

The drive of the pitching belt 6 is controlled by means of a pair of photo-electric cells, viz. one photo-electric cell 8 arranged at the location of the downstream end of the pitching belt and one photo-electric cell 9 arranged above the transverse conveyor, right before the point where the pitching belt 6 connects to the transverse conveyor. The photo-electric cell 9 determines whether the transverse conveyor 1 is clear and the photo-electric cell 8 controls the deactivation of the pitching belt 6.

The driving gear of the various belts and their mutual coupling to the photo-electric cells are not shown, since they are well known per se.

As will be clear from FIG. 2 in particular, the transverse conveyor 1 in its turn may comprise a plurality of transverse conveyors 10, 11 and 12 arranged above each other. They may be mounted in a frame 13, at the top of which a roller conveyor 14 is arranged extending outwardly relatively to the frame 13.

As shown schematically in FIG. 2, the conveyor 3, itself comprising the parts 4, 5, and 6, may be arranged to suit requirements in such a way that the pitching belt 6 connects to one of the transverse carry-off conveyors 10, 11, or 12, or the roller conveyor 14. The roller conveyor 14 has a stop 15 provided at its end away from the conveyor 3. Classes other than those supplied via the belts 10, 11, and 12, for instance, may thus be buffered on this roller conveyor to be removed by hand, for instance.

Adjustment of the conveyor 3 in the various positions can be effected in different ways: a gas spring (not shown) may be used, but other solutions are conceivable. It is possible, furthermore, to move just the parts 5 and 6, for instance, instead of moving the entire conveyor 3, i.e. the first, second, and third parts 4, 5, and 6 as a whole, as shown in FIG. 2.

In a similar way numerous modifications and additions are possible without departing from the scope of the invention. Thus at the end of the transverse conveyor a processing station may be arranged, such as a foiling or labelling machine or the like.

Figure 3:
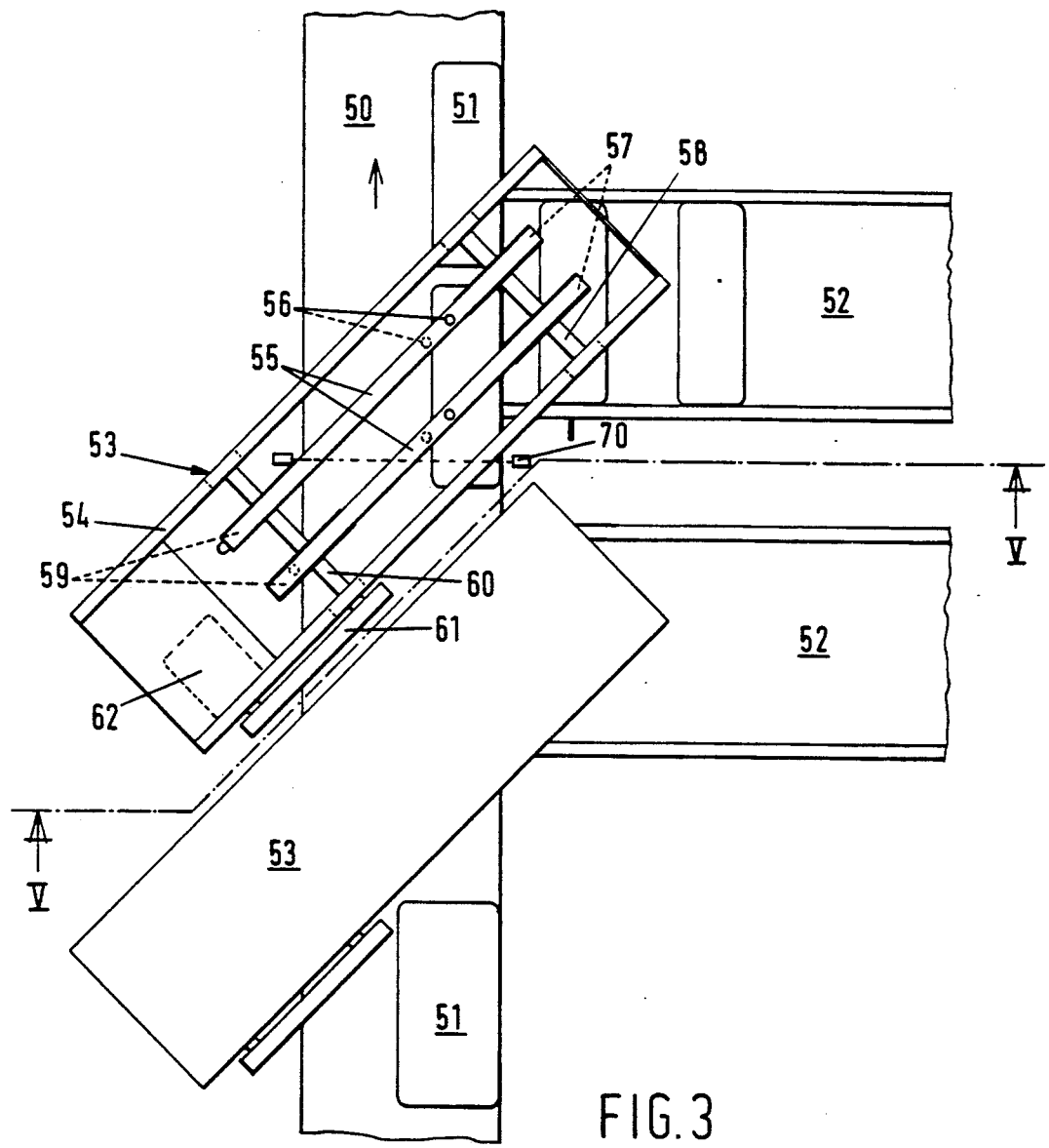
FIG. 3 is a schematic top plan view of an apparatus for transferring objects from a first conveyor to one of a number of second conveyors by means of a transfer member.
Figure 4:
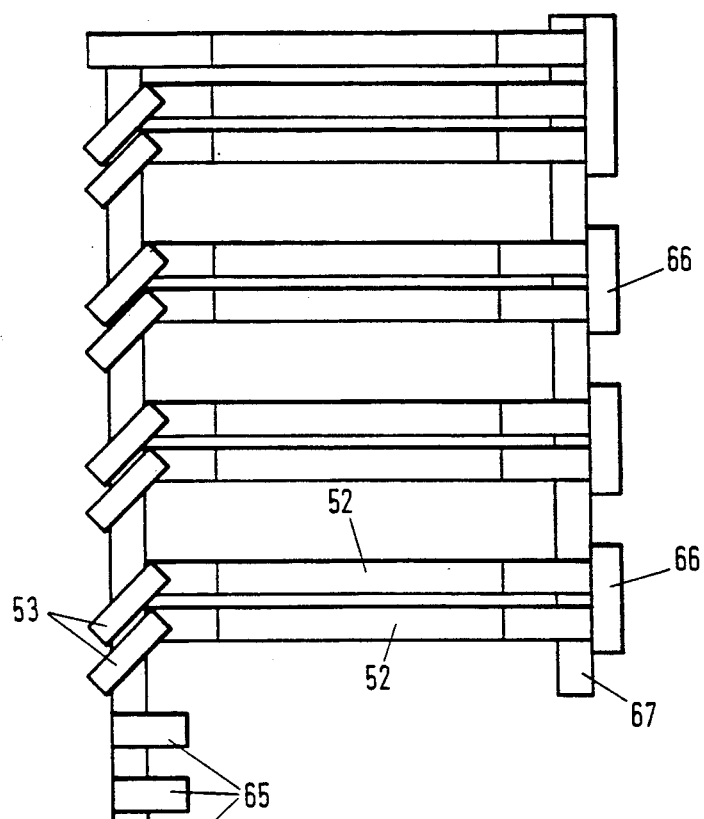
FIG. 4 is a schematic top plan view of a complete apparatus comprising a plurality of members as shown in FIG. 3.
Figure 5:
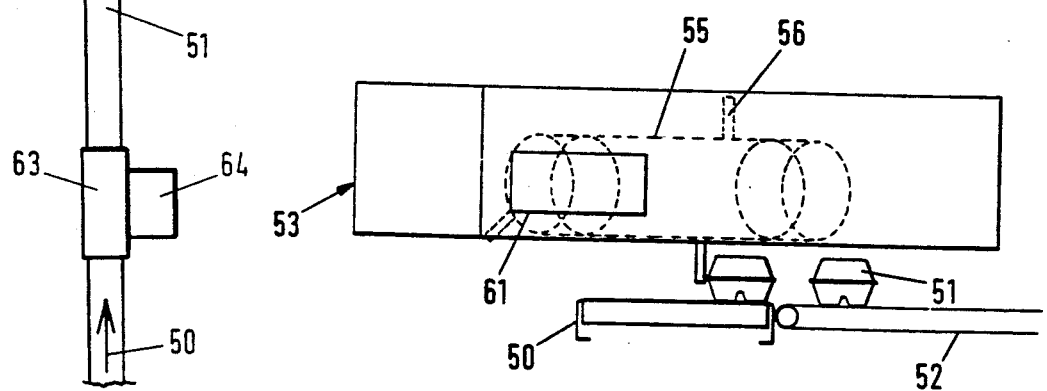
FIG. 5 is a view taken on the line V—V of FIG. 3.

Referring to FIGS. 3, 4 and 5, an apparatus is shown for transferring objects from a first conveyor to a plurality of transverse conveyors; the apparatus comprises a first conveyor 50 carrying a number of objects 51 to be selectively transferred to one of the second, transverse conveyors 52.

To this effect a plurality of transfer members 53 are arranged obliquely above the conveyors. Each transfer member 53 essentially consists of a fixedly mounted frame 54 comprising one or more rotatable endless belts 55 provided with projecting transport pins or strips 56.

At one end the conveyor belts 55 are each mounted on a reversing wheel 57 supported by a shaft 58 and at the other end on driving wheels 59 supported by a shaft 60 driven via a transmission 61 by a motor 62, schematically shown. The motor 62 is activated by the synchronously operating memory of a computer containing the data on the product and the transverse conveyor 52 onto which the product is to be delivered, and which memory controls the motor 62, together with a photoelectric cell 70.

In this connection reference is made to FIG. 4 which shows a schematic top plan view of a complete apparatus, but without the objects. FIG. 4 shows, in succession, a first or longitudinal conveyor 50 with a weighing unit 63 arranged alongside it, coupled to a computer 64. Arranged along the longitudinal conveyor are a plurality of labelling/printing units 65 which supply the objects with a proper code.

Upon further transportation along the longitudinal conveyor 50, the objects are delivered to the desired transverse conveyor 52 by means of the transfer members 53 At the end of the transverse conveyor 52 away from the transfer member, a packing table 66 is positioned on which a plurality of boxes may be arranged. The objects from the transverse conveyor 52 are manually packed in the boxes (not shown), after which the packed boxes are put on a box conveyor 67 running along the packing tables.

Figure 6:
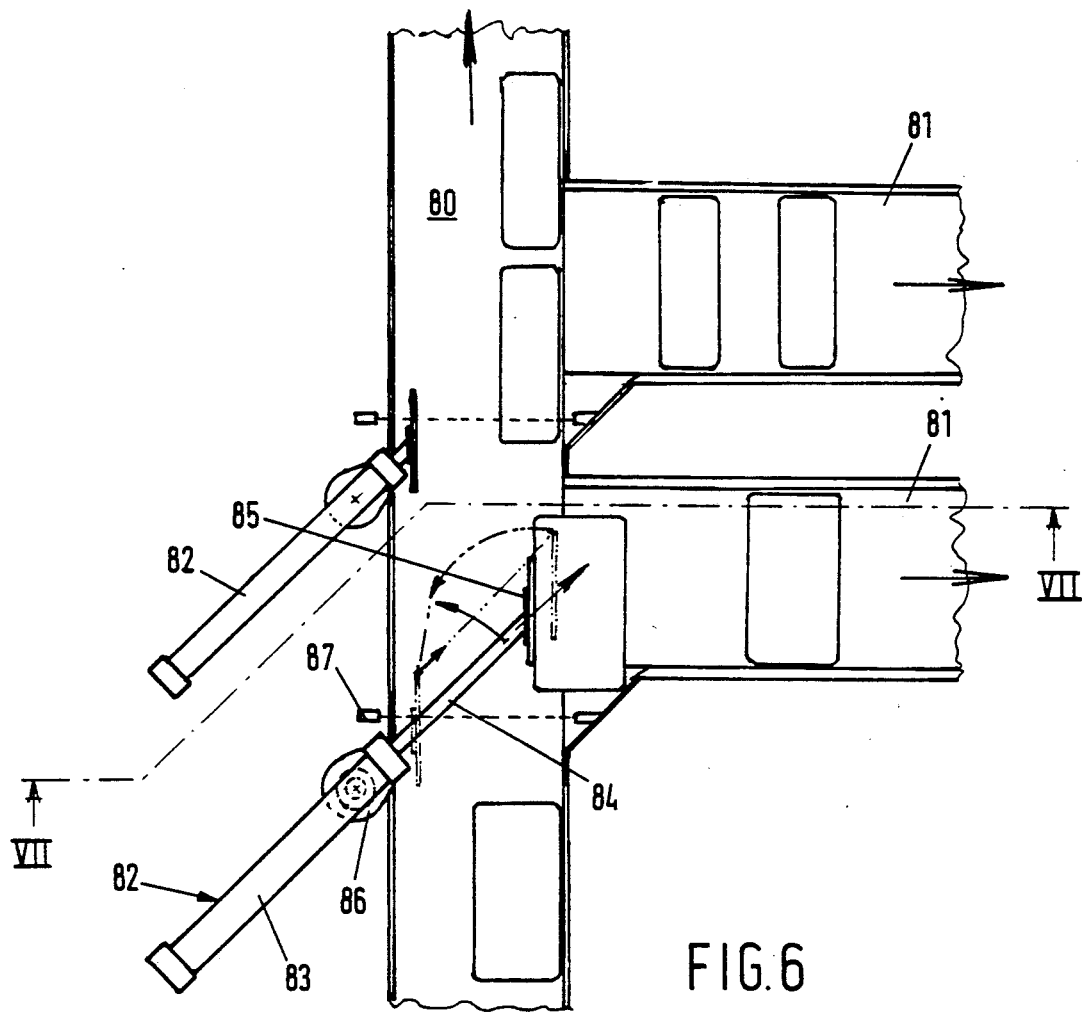
FIG. 6 is a top plan view of another embodiment of the transfer apparatus.
Figure 7:
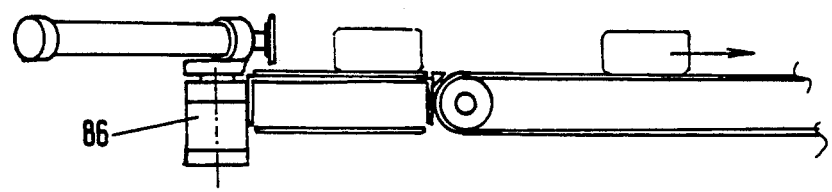
FIG. 7 is a view taken on the line VII—VII of FIG. 6.

In the apparatus shown in FIGS. 6 and 7, above a supply belt or longitudinal conveyor 80 one transfer apparatus 82 is arranged for each delivery or transverse conveyor 81 connecting to the conveyor 80 (only two conveyors 81 are shown). The transfer apparatus 82 essentially consists of a piston-cylinder assembly 83 with a piston rod 84 to which a transfer plate 85 is connected. The transfer plate is here shown as a flat plate, but it will be clear it may also be hook-shaped or have a surface that increases the frictional force.

Figure 8:
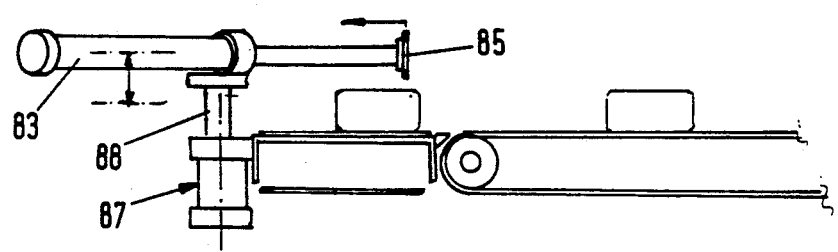
FIG. 8 is a view similar to FIG. 7 of the apparatus during the retraction of the transfer apparatus.

The apparatus is so constructed that the piston-cylinder assembly with the piston rod 84 and the transfer plate 85 is capable of making a movement such as indicated by the broken lines, so that the transfer plate 85, when returning to its initial position, cannot come into contact with objects subsequently supplied. The outgoing movement of piston rod 84 is controlled by means of a photo cell 87 and a selection signal coming from the computer described with reference to the embodiment according to FIGS. 3-5. The apparatus shown in FIG. 8, which is an alternative to the apparatus shown in FIGS. 6 and 7, is different in that instead of a rotary cylinder 86 a piston cylinder 87 is provided, a piston-cylinder assembly 83 with a transfer plate 85 being mounted on the free end of a piston rod 88. In this way, too, the transfer plate can be moved out of the path of subsequent products after it has performed its function of transferring a product from the longitudinal conveyor 80 to the transverse conveyor 81.

We claim:

1. A method of transferring objects from an at least one belt first conveyor to at least one belt second conveyor having objects thereon spaced apart at random distances such that objects transferred to the second conveyor are spaced apart from and in a parallel relationship to each other and such that the objects do not change their relative positions in respect to other objects, comprising:
   (1) arranging the at least one belt first conveyor having a first coefficient of friction perpendicularly to the at least one belt second conveyor having a second coefficient of friction which is substantially less than the first coefficient of friction and such that a terminal end part of the first conveyor is next to and substantially at the same level as the second conveyor;
   (2) continuously moving said second conveyor at predetermined speeds and moving said first conveyor at predetermined speeds or held stationary;
   (3) determining the position of a first object on the first conveyor near said end part;
   (4) determining the position of a second object on the second conveyor near said end part; and
   (5) moving the first conveyor at a speed greater than the speed of the second conveyor and at a speed sufficient to move the first object onto the second conveyor at any position on the belt which is different from and parallel to the second object.

2. The method of claim 1 wherein the first conveyor has a first part distant from said end part which is moved at a constant speed and a second part which is intermediate of the first part and the said terminal end part which is moved at varying speeds but at speeds lower than the speed of the first part so as to function as a buffer part between the first part and the end part.

3. The method of claim 2 wherein the end part is a third part of the first conveyor and the third part is either stationary or moved at a higher speed than the first or second parts.

4. The method of claim 3 wherein the third part is moved or held stationary as a function of the position of the said second object on the second conveyor.

5. The method of claim 2 wherein the first part is moved at a constant speed and the second part and third part are both moved simultaneously or are both stationary, and wherein the third part is moved at higher speeds than the second part and the second part is moved at a lower speed than the first part.

6. The method of claim 1 wherein there are a plurality of said first conveyors.

7. An apparatus for transferring objects from an at least one belt first conveyor to an at least one belt second conveyor having objects thereon spaced apart at random distances such that objects transferred to the second conveyor are spaced apart from and in parallel relationship to each other and such that the objects do not change their relative positions in respect to other objects, comprising:
   (1) means for arranging the at least one belt first conveyor having a first coefficient of friction such that the first conveyor is perpendicular to the at least one belt second conveyor having a second coefficient of friction which is substantially less than the first coefficient of friction and a terminal end part of the first conveyor is next to and substantially at the same level as the second conveyor;
   (2) moving means for moving the said conveyors at predetermined speeds and where the second conveyor runs continuously;
   (3) first sensing means for sensing and determining the position of a fist object on the first conveyor approaching said end part;
   (4) second sensing means for sensing and determining the position of a second object on the second conveyor near said end part; and
   (5) control means for moving the first conveyor at a speed greater than the speed of the second conveyor and at a speed sufficient to move the first object onto the second conveyor at any position on the belt which is different from and parallel to the second object.

8. The apparatus of claim 7 wherein the first conveyor has a first part distant from said end part and the said control means causes the first part to be moveable at a constant speed, a second part intermediate between said first part and said end part and the control means causes the second part to be movable at varying speeds but at speeds lower than the speed of the first part so as to function as a buffer part between the first part and the end part.

9. The apparatus of claim 8 wherein the end part is a third part of the first conveyor and the control means causes the third part to be either stationary or movable at a higher speed than the first or second parts.

10. The apparatus of claim 9 wherein the third part is movable or stationary as a function of the position of the second object on the second conveyor means as sensed and determined by said second sensing means.

11. The apparatus of claim 8 wherein the control means causes the first part to be movable at a constant speed, the second part and the third part to be simultaneously movable or stationary, the third part to be movable at speeds greater than the second part, and the second part is movable at a lower speed than the first part.

12. The apparatus of claim 7 wherein the first sensing means and the second sensing means comprise photoelectric cells.

13. The apparatus of claim 7 wherein a foiling machine is disposed at an end of the second conveyor.

* * * * *